United States Patent
Takagi (10) Patent No.: US 8,531,481 B2
(45) Date of Patent: Sep. 10, 2013

(54) IMAGE DISPLAY APPARATUS, IMAGE DISPLAY METHOD AND PROGRAM

(75) Inventor: Yoshinori Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 13/161,040

(22) Filed: Jun. 15, 2011

(65) Prior Publication Data

US 2011/0310119 A1    Dec. 22, 2011

(30) Foreign Application Priority Data

Jun. 21, 2010  (JP) ................................ P2010-140568

(51) Int. Cl.
  *G09G 5/00*    (2006.01)
(52) U.S. Cl.
  USPC ............................................ 345/620; 382/118
(58) Field of Classification Search
  USPC ................................................... 345/620
  See application file for complete search history.

(56) References Cited

U.S. PATENT DOCUMENTS

| 2005/0162445 | A1* | 7/2005 | Sheasby et al. ............. 345/620 |
| 2009/0303351 | A1* | 12/2009 | Ogawa ....................... 348/231.6 |
| 2011/0254972 | A1* | 10/2011 | Yaguchi ..................... 348/222.1 |

FOREIGN PATENT DOCUMENTS

JP    2008-311808    12/2008

* cited by examiner

*Primary Examiner* — Ulka Chauhan
*Assistant Examiner* — Jin Ge
(74) *Attorney, Agent, or Firm* — Frommer Lawrence & Haug LLP; William S. Frommer (57) ABSTRACT

There is provided an image display apparatus including an acquisition unit for acquiring image data of an original image and cut frame information for designating a range of a cut image cut from the original image, a calculation unit for calculating a length of a perpendicular line from a corner portion of the cut image to an outer frame serving as a reference facing the corner portion of the cut image among outer frames of the original image, based on the cut frame information, a creation unit for creating an implication line corresponding to the length of the perpendicular line as image data, and a display unit for displaying the implication line extending from the corner portion of the cut image to a side opposite to the outer frame serving as the reference of the original image, together with the cut image.

15 Claims, 11 Drawing Sheets

| # IMAGE DISPLAY APPARATUS, IMAGE DISPLAY METHOD AND PROGRAM

BACKGROUND OF THE INVENTION

1. Field of the Invention

The present invention relates to an image display apparatus, an image display method, and a program.

2. Description of the Related Art

In video/image expression, cutting (bust shot, full shot, long shot and the like) of a subject is a very important point. Usually, cutting of a subject is performed when an image is photographed. Meanwhile, as disclosed in Japanese Unexamined Patent Application Publication No. 2008-311808, if real-time, high image quality processing is put to practical use, it is possible to display a cut image cut from an original image as a zoom image with sufficient accuracy in real time based on image data of the original image and cut frame information for designating a range of the cut image.

SUMMARY OF THE INVENTION

In this case, in the cut image, at least ostensibly, since information on an out-of-frame region located outside of the cut image is lost, access to the original image may be difficult. In order to improve accessibility to the original image, the range of the original image may be implied and displayed using a frame line showing the original image and a frame line showing the cut image by allowing the original image to overlap the cut image. However, in this case, the range of the original image may not be clearly implied in the first place or the legibility of the cut image may be reduced.

In light of the foregoing, it is desirable to provide an image display apparatus, an image display method, and a program, which can display information on an out-of-frame region located outside of a cut image without reducing the legibility of the cut image.

According to an embodiment of the present invention, there is provided an image display apparatus including an acquisition unit for acquiring image data of an original image and cut frame information for designating a range of a cut image cut from the original image, a calculation unit for calculating a length of a perpendicular line from a corner portion of the cut image to an outer frame serving as a reference facing the corner portion of the cut image among outer frames of the original image, based on the cut frame information, a creation unit for creating an implication line corresponding to the length of the perpendicular line as image data, and a display unit for displaying the implication line extending from the corner portion of the cut image to a side opposite to the outer frame serving as the reference of the original image, together with the cut image.

The creation unit may create an implication line including, as an implication image, image information of a region along the perpendicular line from the corner portion of the cut image to the outer frame serving as the reference of the original image.

The implication image may indicate a representative value of image data of the region along the perpendicular line.

The implication image may indicate a representative value of image data of a predetermined region located around the perpendicular line.

The implication image may indicate a representative value of image data of a region along a straight line orthogonal to the perpendicular line.

The creation unit may create an implication line including the implication image to be displayed separately from the cut image.

When a length of the perpendicular line is greater than that of the cut image at a side opposite to the outer frame serving as the reference of the original image from the corner portion of the cut image, the creation unit may create the implication line to be folded and displayed in a range of the length of the cut image.

The display unit may display the implication line at an outer edge side of the cut image without overlapping the cut image.

The display unit may display the implication line at an inner edge side of the cut image while overlapping the cut image.

The creation unit may create two implication lines corresponding to lengths of perpendicular lines from the corner portion of the cut image to two outer frames serving as references facing the corner portion of the cut image among outer frames of the original image, and the display unit displays the two implication lines extending from the corner portion of the cut image to sides opposite to corresponding outer frames.

The corner portion of the cut image may be a pair of corner portions located on a diagonal of the cut image.

The display unit may display, for a plurality of original images, the cut images corresponding to the original images and the implication lines side by side.

According to an embodiment of the present invention, there is provided an image display method including the steps of acquiring image data of an original image and cut frame information for designating a range of a cut image cut from the original image, calculating a length of a perpendicular line from a corner portion of the cut image to an outer frame serving as a reference facing the corner portion of the cut image among outer frames of the original image, based on the cut frame information, creating an implication line corresponding to the length of the perpendicular line as image data, and displaying the implication line extending from the corner portion of the cut image to a side opposite to the outer frame serving as the reference of the original image, together with the cut image.

The step of creating the implication line may include creating an implication line including, as an implication image, image information of a region along the perpendicular line from the corner portion of the cut image to the outer frame serving as the reference of the original image.

According to an embodiment of the present invention, there is provided a program causing a computer to execute the steps of acquiring image data of an original image and cut frame information for designating a range of a cut image cut from the original image, calculating a length of a perpendicular line from a corner portion of the cut image to an outer frame serving as a reference facing the corner portion of the cut image among outer frames of the original image, based on the cut frame information, creating an implication line corresponding to the length of the perpendicular line as image data, and displaying the implication line extending from the corner portion of the cut image to a side opposite to the outer frame serving as the reference of the original image, together with the cut image.

In addition, the program may be provided using a computer readable recording medium or through a communication means and the like.

According to the embodiments of the present invention described above, it is possible to provide an image display apparatus, an image display method, and a program, which can display information on an out-of-frame region located outside of a cut image without reducing the legibility of the cut image.

DETAILED DESCRIPTION OF THE EMBODIMENT(S)

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. OVERVIEW OF IMAGE DISPLAY METHOD

First, an overview of an image display method according to an embodiment of the present invention will be described with reference to FIG. 1.

An object of the image display method according to the embodiment of the present invention is to imply and display information on an out-of-frame region located outside of a cut image It without reducing the legibility of the cut image It, when displaying the cut image It.

Figure 1:
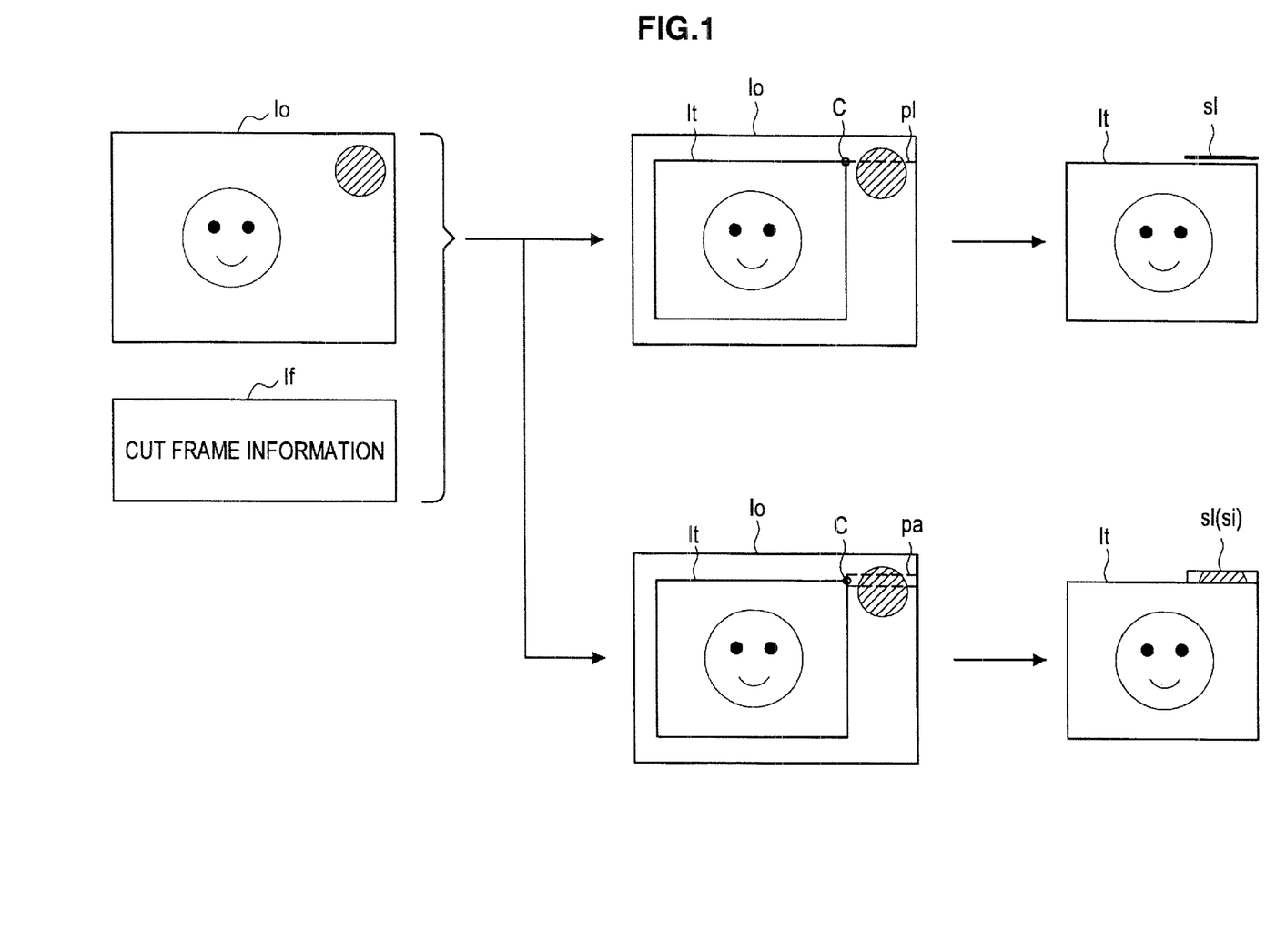
FIG. 1 is a diagram illustrating an overview of an image display method according to an embodiment of the present invention.

As illustrated in FIG. 1, in the image display method, image data of an original image Io and cut frame information If are acquired. Here, the cut frame information If is information for designating a range of the cut image It cut from the original image Io.

Next, based on the cut frame information If, the length of a perpendicular line p1 from a corner portion c of the cut image It to an outer frame serving as a reference facing the corner portion c of the cut image It among outer frames of the original image Io is calculated, and an implication line s1 corresponding to the length of the perpendicular line p1 is created. In this case, the implication line s1 indicates a distance from the corner portion c of the cut image It to the outer frame serving as the reference of the original image Io, thereby implying the range of the out-of-frame region located outside of the cut image It. In addition, when the original image has a rectangular shape, the outer frame of the original image Io corresponds to an outer edge of the original image Io and includes an upper frame, a lower frame, a left frame and a right frame corresponding to the edges of an upper side, a lower side, a left side and a right side of the original image Io. Furthermore, the outer frame serving as the reference, for example, corresponds to the upper frame or the right frame corresponding to the edge of the upper side or the right side of the original image Io with respect to the right upper corner portion c of the cut image It.

Then, together with the cut image It, the implication line s1 extending from the corner portion c of the cut image It to a side opposite to the outer frame serving as the reference of the original image Io is displayed. In addition, in the example illustrated in FIG. 1, the range of an out-of-frame region located in the right side of the cut image It is implied and displayed.

Consequently, since the implication line s1 is displayed from the corner portion c of the cut image It, it is possible to display the range of the out-of-frame region without reducing the legibility of the cut image It. Furthermore, since the implication line s1 extending to a side opposite to the outer frame serving as the reference of the original image Io is displayed, it is possible to improve accessibility of the cut image It to the original image Io using a limited display region.

Furthermore, in the image display method, the implication line s1, which includes image information on a region pa along the perpendicular line p1 from the corner portion c of the cut image It to the outer frame serving as the reference of the original image Io as an implication image si, may be created. In this case, the implication line s1 indicates the image information on the region pa from the corner portion c of the cut image It to the outer frame serving as the reference of the original image Io, thereby implying the content of an image of the out-of-frame region located outside of the cut image It. In addition, in the example illustrated in FIG. 1, the content of an image of an out-of-frame region located in the right side of the cut image It is implied and displayed.

Then, since the implication line s1 including the implication image si is displayed from the corner portion c of the cut image It, it is possible to display the content of the image of the out-of-frame region without reducing the legibility of the cut image It. Furthermore, since the implication line s1 including the implication image si is displayed while extending to a side opposite to the outer frame serving as the reference of the original image Io, it is possible to improve the accessibility of the cut image It to the original image Io using a limited display region.

2. FUNCTIONAL CONFIGURATION OF IMAGE DISPLAY APPARATUS

Next, the functional configuration of the image display apparatus 10 according to the embodiment of the present invention will be described with reference to FIG. 2.

Figure 2:
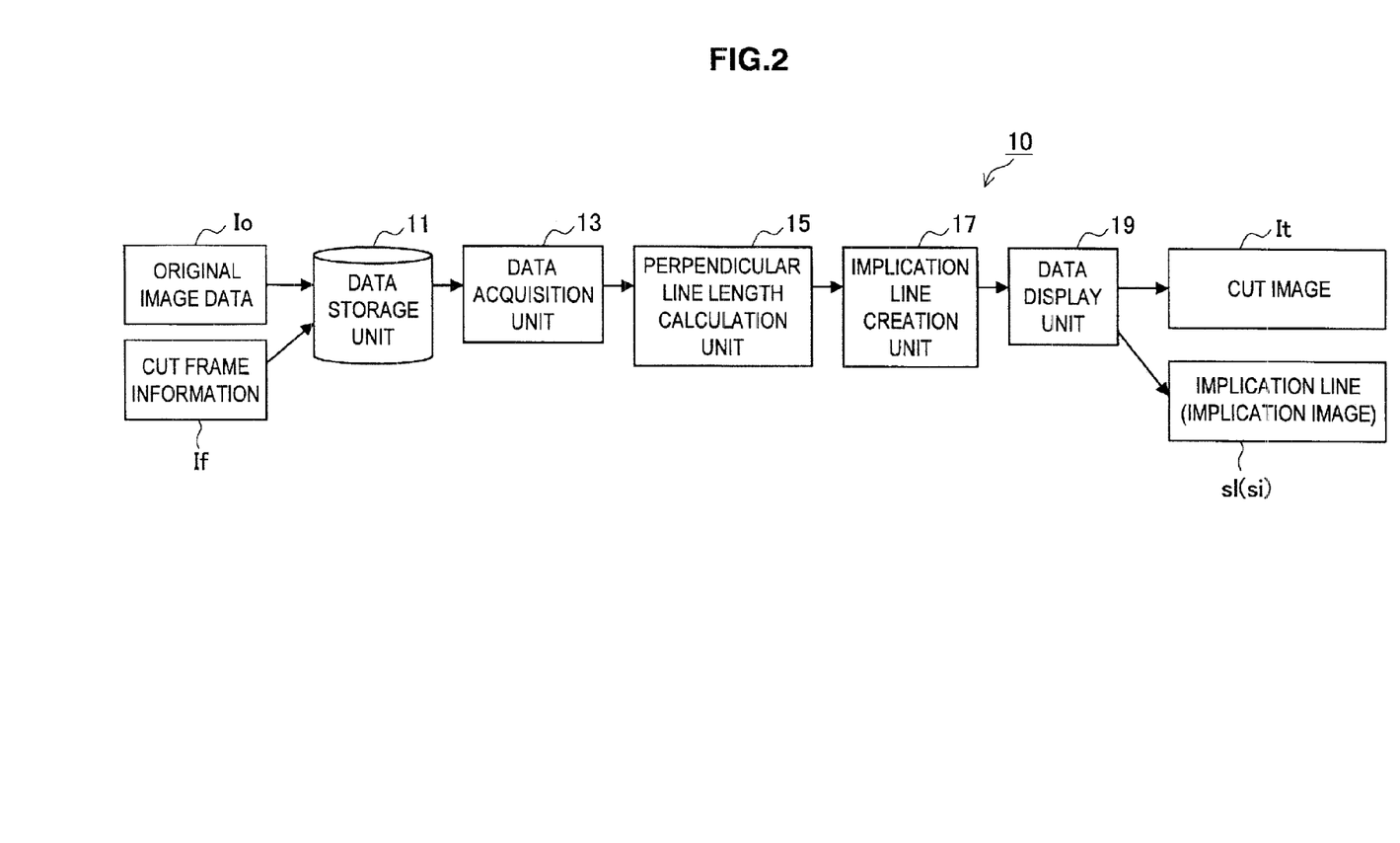
FIG. 2 is a block diagram illustrating a functional configuration of an image display apparatus according to an embodiment of the present invention.

As illustrated in FIG. 2, the image display apparatus 10 includes a data storage unit 11, a data acquisition unit 13, a perpendicular line length calculation unit 15, an implication line creation unit 17, and a data display unit 19. The image display apparatus 10, for example, is configured as a part of an imaging apparatus such as a still camera or a video camera, or a part of an information processing apparatus such as a personal computer or an image viewer.

The data storage unit 11 stores the image data of the original image Io in association with the cut frame information If for designating the range of the cut image It cut from the original image Io. In addition, the data storage unit 11 may be configured by a plurality of storage devices for separately storing the image data of the original image Io and the cut frame information If.

The cut frame information If may have various formats as long as it can designate the range of the cut image It included in the original image Io. The range of the cut image It, for example, can be designated by the number of horizontal and vertical pixels of the original image Io, the number of horizontal and vertical pixels of the cut image It, and a coordinate of one corner portion c of the cut image It on the original image Io. Furthermore, the range of the cut image It may be designated by the number of horizontal and vertical pixels of the original image Io, and coordinates of a pair of corner portions c located on a diagonal of the cut image It.

The image data of the original image Io and the cut frame information If, for example, are created by an external apparatus (not shown) such as an imaging apparatus or an information processing apparatus, or the image display apparatus 10 itself and stored in advance in the data storage unit 11. The cut frame information If is created by a user operation or an automatic process on the external apparatus or the image display apparatus 10 when the original image Io is photographed or edited.

The data acquisition unit 13 acquires the image data of the original image Io and the cut frame information If. In addition, in the example illustrated in FIG. 2, the image data and the cut frame information If are acquired from the data storage unit 11. However, the image data of the original image Io and the cut frame information If may be acquired from the external apparatus through a transmission means.

The perpendicular line length calculation unit 15 calculates the length of the perpendicular line p1 from the corner portion c of the cut image It to the outer frame servings as the reference facing the corner portion c of the cut image It among the outer frames of the original image Io based on the cut frame information If. The length of the perpendicular line p1 is calculated as the difference between the coordinate of the corner portion c of the cut image It and the coordinate of the outer frame serving as the reference of the original image Io. For example, the length of the perpendicular line p1 from the right upper corner portion c of the cut image It to the right frame of the original image Io is calculated as the difference between the abscissa of the corner portion c and the abscissa of the right frame.

The implication line creation unit 17 creates the implication line s1 corresponding to the length of the perpendicular line p1 from the corner portion c of the cut image It to the outer frame serving as the reference of the original image Io. The implication line s1 is created as display data based on the calculated length of the perpendicular line p1. Furthermore, the implication line creation unit 17 may create the implication line s1 including the image information on the region pa along the perpendicular line p1, which is from the corner portion c of the cut image It to the outer frame serving as the reference of the original image Io, as the implication image si. In this case, the implication line s1 is created by extracting image data of the region pa of one to several pixel rows/columns along the perpendicular line p1 from the image data of the original image Io as the implication image si based on the coordinate of the corner portion c of the cut image It and the coordinate of the outer frame serving as the reference of the original image Io.

The data display unit 19 displays the implication line s1 extending from the corner portion c of the cut image It to a side opposite to the outer frame serving as the reference of the original image Io, together with the cut image It. The implication line s1, which will be described in detail later, is basically displayed based on the coordinate of the corner portion c of the cut image It, together with the cut image It.

Here, in the functional configuration, the data storage unit 11 is configured by a non-volatile memory such as a flash memory, an external storage device such as an HDD or a BD, and the like, the data acquisition unit 13, the perpendicular line length calculation unit 15 and the implication line creation unit 17 are configured by an operation processing device such as a CPU, and the data display unit 19 is configured by a display device such as a liquid crystal device. The CPU performs an image display method by developing and executing a program read from a ROM and the like on a RAM. In addition, at least a part of the functional configuration may be configured as hardware such as a dedicated logic.

3. DISPLAY METHOD FOR IMPLYING RANGE OF OUT-OF-FRAME REGION

Next, the display method for implying the range of the out-of-frame region located outside of the cut image It will be described with reference to FIGS. 3 and 4.

Figure 3:
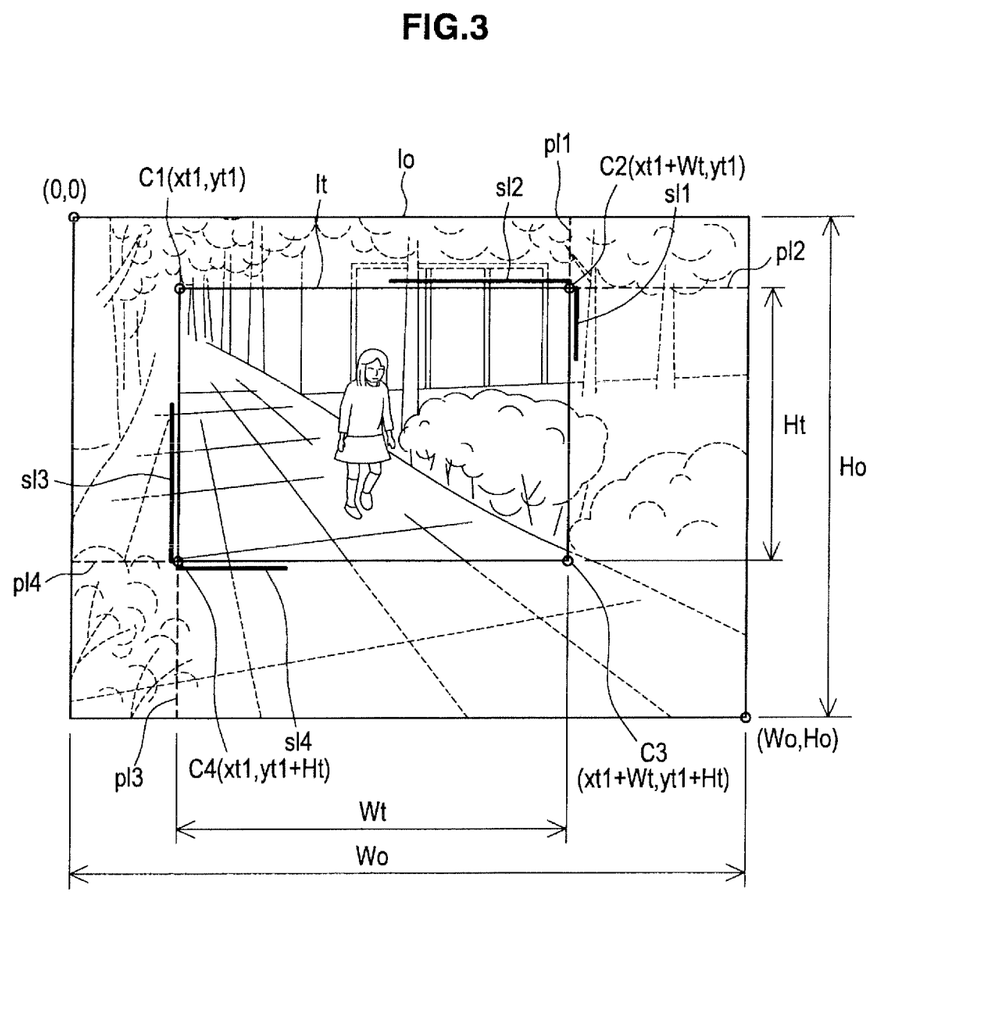
FIG. 3 is a diagram illustrating a display method for implying a range of an out-of-frame region.

As illustrated in FIG. 3, the cut image It is configured as an image of the original image Io in the range designated by the cut frame information If. In addition, in the drawings including FIG. 3 in which the cut image It is displayed together with the original image Io, the image information on the out-of-frame region is indicated by broken lines. However, when actually displaying the cut image It, the image information on the out-of-frame region is omitted and only the cut image It is displayed.

In the example illustrated in FIG. 3, in the original image Io, the number of horizontal pixels is Wo, the number of vertical pixels is Ho, the coordinate of the left upper corner portion c is (0, 0), and the coordinate of the right lower corner portion c is (Wo, Ho). In the cut image It, the number of horizontal pixels is Wt, the number of vertical pixels is Ht, the coordinate of a left upper corner portion c1 is (xt1, yt1), the coordinate of a right upper corner portion c2 is (xt1+Wt, yt1), the coordinate of a right lower corner portion c3 is (xt1+Wt, yt1+Ht), and the coordinate of a left lower corner portion c4 is (xt1, yt1+Ht).

Thus, the range of the cut image It can be designated by the cut frame information If including the number (Wo, Ho) of horizontal and vertical pixels of the original image Io, the number (Wt, Ht) of horizontal and vertical pixels of the cut image It, and the coordinate (xt1, yt1) of the left upper corner portion c1. Here, an out-of-frame region having a height of yt1 is at an upper side of the cut image It, an out-of-frame region having a height of (Ho−Ht−yt1) is at a lower side of the cut image It, an out-of-frame region having a width of xt1 is at a left side of the cut image It, and an out-of-frame region having a width of (Wo−Wt−xt1) is at a right side of the cut image It.

The following description will be given about a case where the out-of-frame regions located at the upper side, lower side, left side and right side of the cut image It are displayed by employing the right upper corner portion c2 and the left lower corner portion c4 of the cut image It as a reference.

In this case, when considering the corner portion c2, while the upper frame and the right frame of the original image Io may be the outer frame serving as the reference because they face the corner portion c2, the lower frame and the left frame may not be the outer frame serving as the reference because they do not face the corner portion c2. Likewise, when considering the corner portion c4, while the lower frame and the left frame of the original image Io may be the outer frame serving as the reference because they face the corner portion c4, the upper frame and the right frame may not be the outer frame serving as the reference because they do not face the corner portion c4.

The lengths of perpendicular lines pl1 and pl2 from the corner portion c2 to the upper frame and the right frame forming the outer frame serving as the reference of the original image Io are calculated as yt1 and (Wo−Wt−xt1), respectively. Furthermore, the lengths of perpendicular lines pl3 and pl4 from the corner portion c4 to the lower frame and the left frame forming the outer frame serving as the reference are calculated as (Ho−Ht−yt1) and xt1, respectively.

Thus, as illustrated in FIG. 3, together with the cut image It, an implication line sl1 with a length of pl1 (=yt1) extending from the corner portion c2 to a bottom side opposite to the upper frame of the original image Io is displayed, and an implication line sl2 with a length of pl2 (=Wo−Wt−xt1) extending from the corner portion c2 to the left side opposite to the right frame of the original image Io is displayed. Likewise, an implication line sl3 with a length of pl3 (=Ho−Ht−yt1) extending from the corner portion c4 to a top side opposite to the lower frame of the original image Io is displayed, and an implication line sl4 with a length of pl4 (=xt1) extending from the corner portion c4 to a right side opposite to the left frame of the original image Io is displayed.

Figure 4:
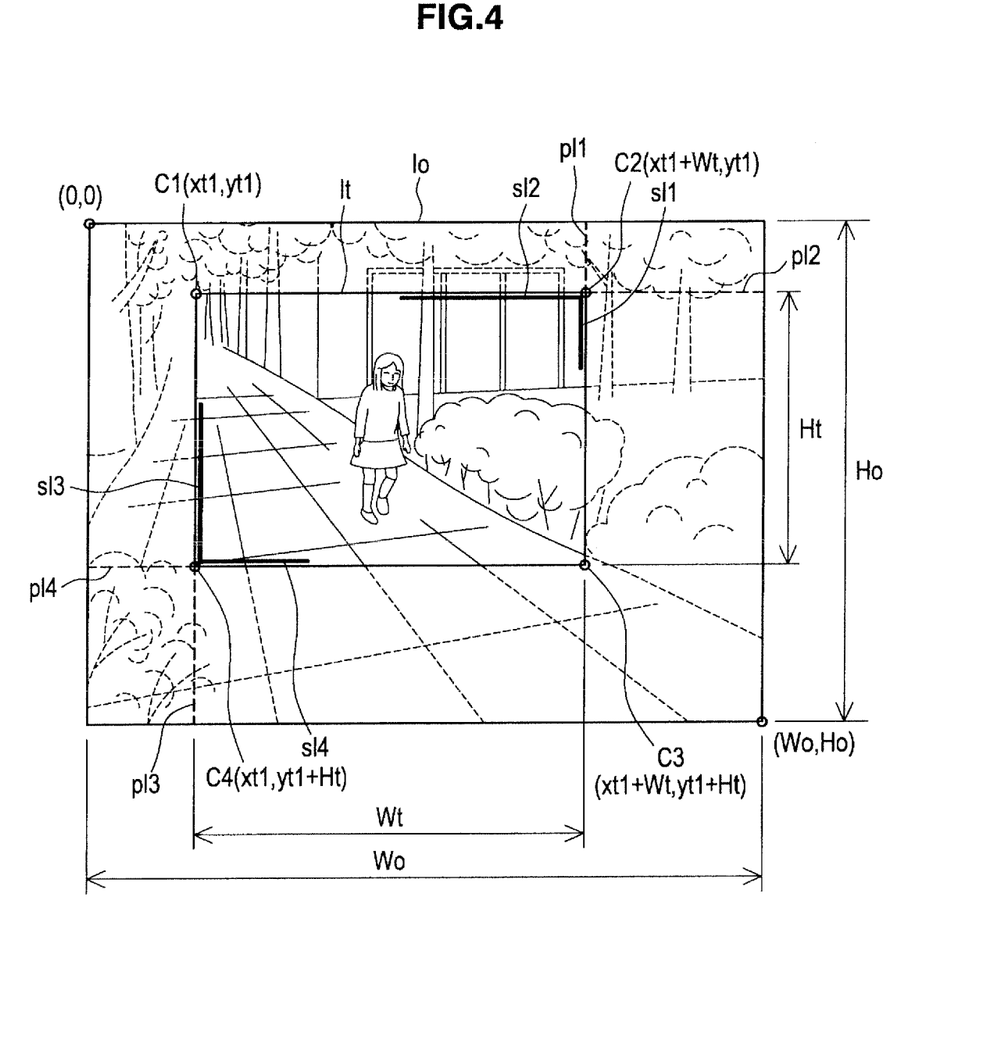
FIG. 4 is a diagram illustrating a modification example of the display method illustrated in FIG. 3.

FIG. 4 illustrates a modification example of the display method illustrated in FIG. 3. In the example illustrated in FIG. 3, implication lines sl1 to sl4 are displayed at outer edge sides of a cut image It without overlapping the cut image It. However, when a display region is limited at the outer edge sides of the cut image It, the implication lines sl1 to sl4 may be displayed at the inner edge sides of the cut image It while overlapping and cutting the cut image It.

Figure 5:
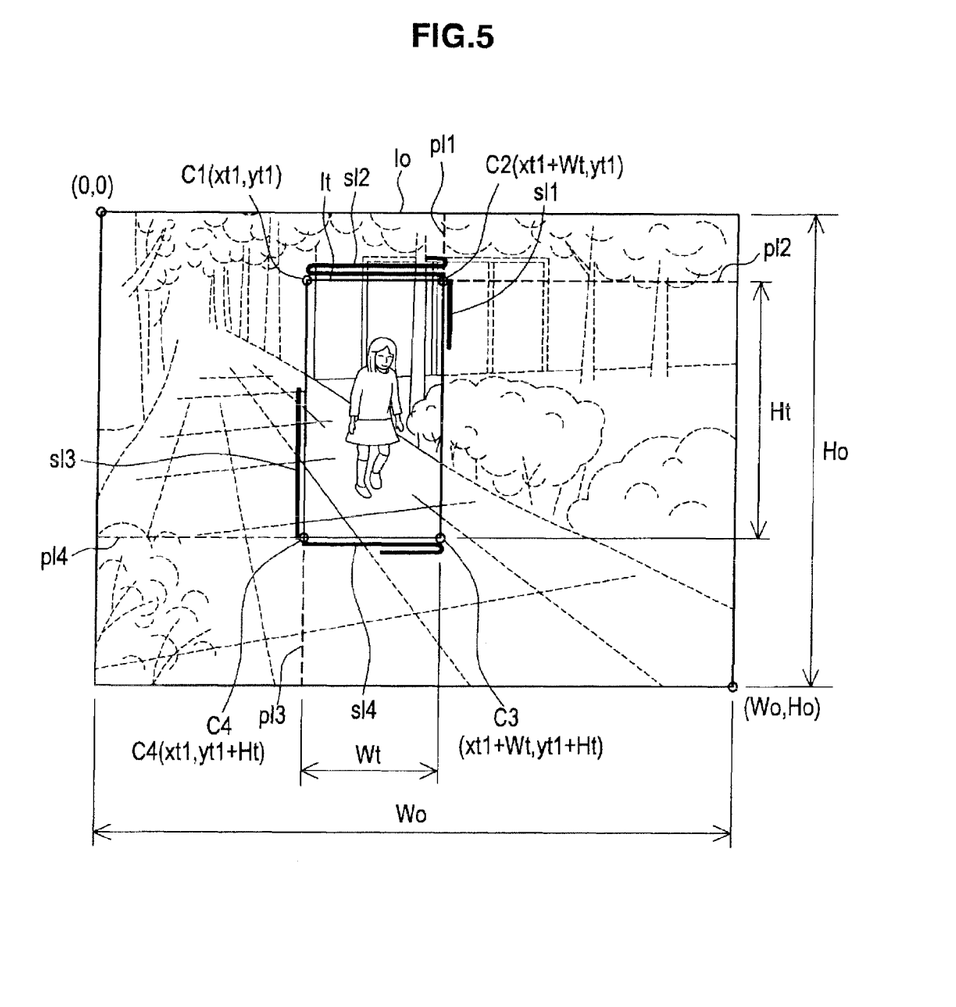
FIG. 5 is a diagram illustrating a modification example of the display method illustrated in FIG. 3.

FIG. 5 illustrates another modification example of the display method illustrated in FIG. 3. In the example illustrated in FIG. 5, a cut image It is significantly small as compared with the original image Io, and the length of pl2 (=Wo−Wt−xt1) of the perpendicular line pl2 from the corner portion c2 to the right frame of the original image Io is significantly large (Wt<<pl2) as compared with the number Wt of horizontal pixels of the cut image It. In addition, in the case of FIG. 5, the outer frame facing the corner portion c2 is the upper frame and the right frame (the lower frame and the left frame do not face the corner portion c2). Thus, when displaying the implication line sl2 with a length of pl2 extending from the corner portion c2 to the left side opposite to the right frame of the original image Io as illustrated in FIG. 3, the implication line sl2 exceeds the number Wt of horizontal pixels of the cut image It. Thereby, in the example illustrated in FIG. 5, the implication line sl2 is folded in a zigzag shape for display.

Here, in the example illustrated in FIG. 5, the implication line s1 is folded in a zigzag shape for display. However, the implication line s1 may be displayed by vertically overlapping folded portions with each other, or may be displayed using different colors, different concentrations, different types and the like.

So far, the above description has been given about the case where the out-of-frame regions located at the upper side, lower side, left side and right side of the cut image It are displayed using the implication lines sl1 to sl4 employing a pair of corner portions (the right upper corner portion c2 and the left lower corner portion c4) located on the diagonal of the cut image It as a reference. However, the out-of-frame regions may be displayed using implication lines sl1 to sl4 employing the left upper corner portion c1, the right upper corner portion c2, the right lower corner portion c3, and the left lower corner portion c4 of the cut image It as a reference.

In this case, for example, the out-of-frame region located at the left side of the cut image it may be displayed using the implication lines sl2 employing the corner portion c1 as a reference, the out-of-frame region located at the upper side may be displayed using the implication lines sl1 employing the corner portion c2 as a reference, the out-of-frame region located at the right side may be displayed using the implication lines sl4 employing the corner portion c3 as a reference, and the out-of-frame region located at the lower side may be displayed using the implication lines sl3 employing the corner portion c4 as a reference.

Furthermore, for example, when the out-of-frame regions are only at the upper and lower sides of the cut image It, the out-of-frame region located at the upper side of the cut image It is displayed using the implication lines sl1 employing the corner portion c1 or the corner portion c2 as a reference, and the out-of-frame region located at the lower side is displayed using the implication lines sl3 employing the corner portion c3 or the corner portion c4 as a reference. Likewise, when the out-of-frame regions are only at the right and left sides of the cut image It, the out-of-frame region located at the left side of the cut image It is displayed using the implication lines sl4 employing the corner portion c1 or the corner portion c4 as a reference, and the out-of-frame region located at the right side is displayed using the implication lines sl2 employing the corner portion c2 or the corner portion c3 as a reference.

Consequently, it is possible to imply and display the range of the out-of-frame region, that is, the presence of the original image Io and the size of the original image Io without reducing the legibility of the cut image It. Furthermore, it is possible to improve the accessibility of the cut image It to the original image Io using a limited display region.

4. DISPLAY METHOD FOR IMPLYING CONTENT OF IMAGE OF OUT-OF-FRAME REGION

Next, the display method for implying the content of the image of the out-of-frame region located outside of the cut image It will be described with reference to FIGS. 6 and 7.

Figure 6:
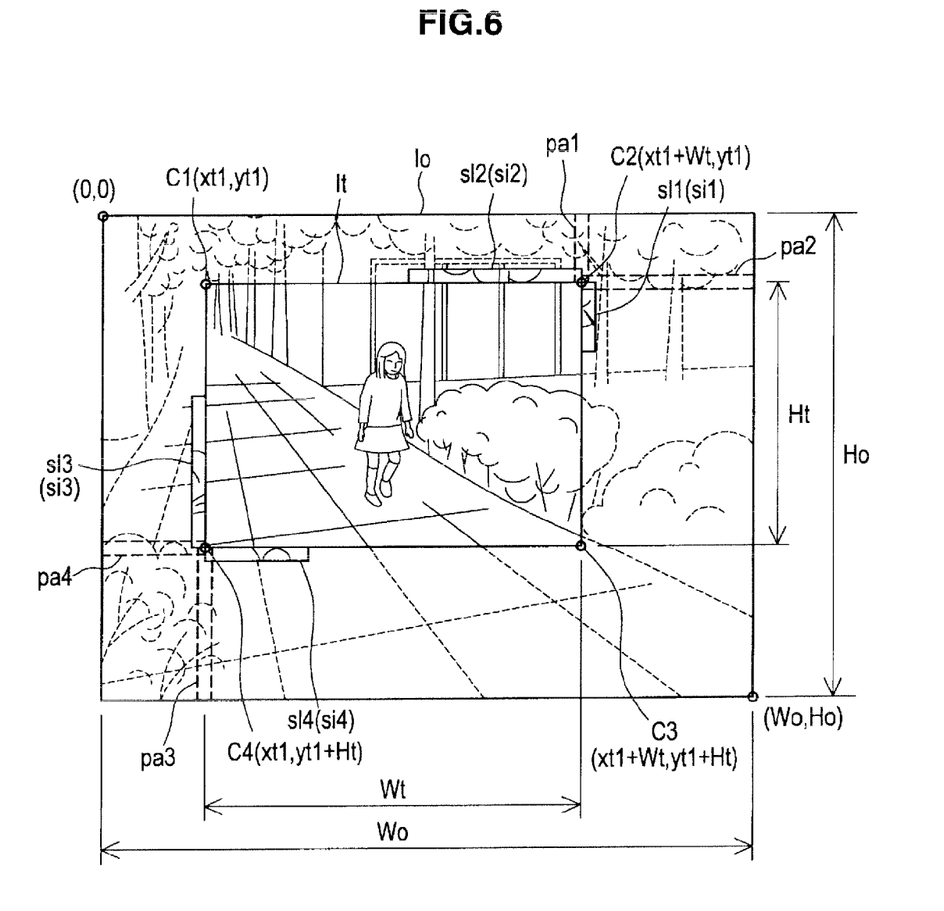
FIG. 6 is a diagram illustrating a display method for implying the content of an image of an out-of-frame region.

As illustrated in FIG. 6, the implication lines s1 are created to include the image information on the region pa along the perpendicular line p1 from the corner portion c of the cut image It to the outer frame serving as the reference of the original image Io as the implication image si.

Even in the example illustrated in FIG. 6, it is assumed that the range of the cut image It is designated by the cut frame information If including the number (Wo, Ho) of horizontal and vertical pixels of the original image Io, the number (Wt, Ht) of horizontal and vertical pixels of the cut image It, and the coordinates (xt1, yt1) of the left upper corner portion c1 of the cut image It.

Thus, together with the cut image It, the implication line sl1 with a length of pl1 (=yt1) extending downward from the corner portion c2 is displayed, and the implication line sl2 with a length of pl2 (=Wo−Wt−xt1) extending leftward from the corner portion c2 is displayed. Likewise, the implication line sl3 with a length of pl3 (=Ho−Ht−yt1) extending upward from the corner portion c4 is displayed, and the implication line sl4 with a length of pl4 (=xt1) extending rightward from the corner portion c4 is displayed.

The implication lines sl1 and sl2 are created to include image data of regions pa1 and pa2 along perpendicular lines pl1 and pl2 from the corner portion c2 to the upper frame and the right frame of the original image Io as implication images si1 and si2, respectively. Furthermore, the implication lines sl3 and sl4 are created to include image data of regions pa3 and pa4 along perpendicular lines pl3 and pl4 from the corner portion c4 to the lower frame and the left frame of the original image Io as implication images si3 and si4, respectively.

The implication image si, for example, in the case of the implication image si1 or si2, is extracted from the image data of the original image Io as image data corresponding to the pixel regions pa1 and pa2 corresponding to one to several columns or rows along the perpendicular line pl1 or pl2 from the corner portion c2 to the upper frame or the right frame of the original image Io. The implication line sl1 is displayed as a line segment having a predetermined width and filled with image data as the implication image si.

Here, in the example illustrated in FIG. 6, the implication lines sl1 to sl4 including the implication images si1 to si4 are displayed at the outer edge sides of the cut image It without overlapping the cut image It. However, when a display region is limited at the outer edge sides of the cut image It similarly to the case illustrated in FIG. 4, the implication lines sl1 to sl4 including the implication images si1 to si4 may be displayed at the inner edge sides of the cut image It while overlapping and cutting the cut image It.

Furthermore, in the example illustrated in FIG. 6, the implication image si is moved in parallel to the cut image It and displayed as the image data itself of the original image Io. However, the implication image si may be folded toward the cut image It and displayed as image data obtained by vertically or horizontally inverting the image data of the original image Io.

Furthermore, the implication image si is displayed separately from the cut image It. For example, the implication image si may be displayed after being painted with a predetermined color, may be displayed by lowering brightness thereof, or may be displayed with low shading.

Figure 7:
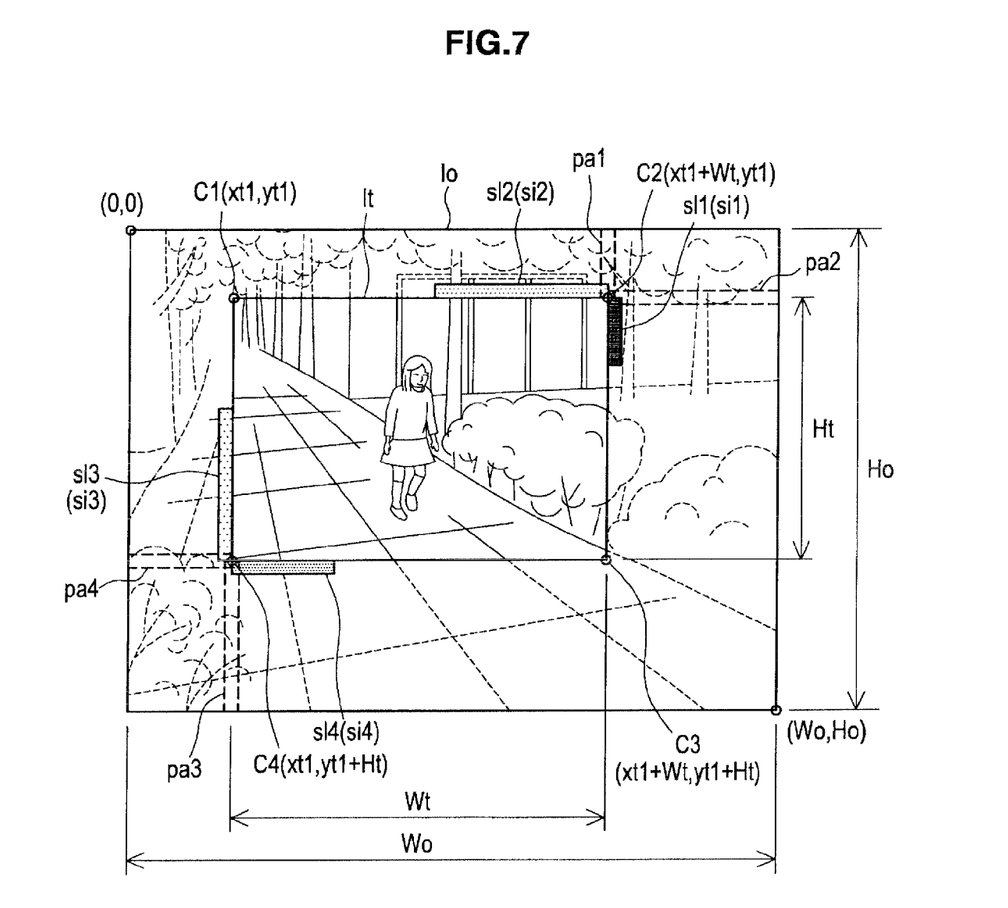
FIG. 7 is a diagram illustrating a modification example of the display method illustrated in FIG. 6.

Furthermore, as illustrated in FIG. 7, the implication line s1 may be created to include a representative value of the image data of the region pa along the perpendicular line p1 as the implication image si, instead of the image data of the region pa along the perpendicular line p1. The representative value of the image data, for example, indicates a color, a pattern and the like of pixels included in the region pa along the perpendicular line p1 with the highest frequency. In addition, in FIG. 7 and FIGS. 8 to 11, which will be described later, for the convenience of display, the representative value of the image data is displayed using various types of dot hatching.

The implication image si, for example, in the case of the implication image si1 or si2, is extracted from the image data of the original image Io as a representative value of image data corresponding to the pixel regions pa1 and pa2 corresponding to one to several columns or rows along the perpendicular line pl1 or pl2 from the corner portion c2 to the upper frame or the right frame of the original image Io. The implication line sl1 is displayed as a line segment having a predetermined width and filled with a representative value of image data as the implication image si.

Furthermore, the implication line s1 may be created to include a representative value of image data of a predetermined region pa located around the perpendicular line p1 as the implication image si, instead of a representative value of image data of a region along the perpendicular line p1. Hereinafter, while an out-of-frame region located at the lower side of the cut image It will be described, out-of-frame regions located at the upper side, right side and left side of the cut image It can be described in the same manner.

Figure 8:
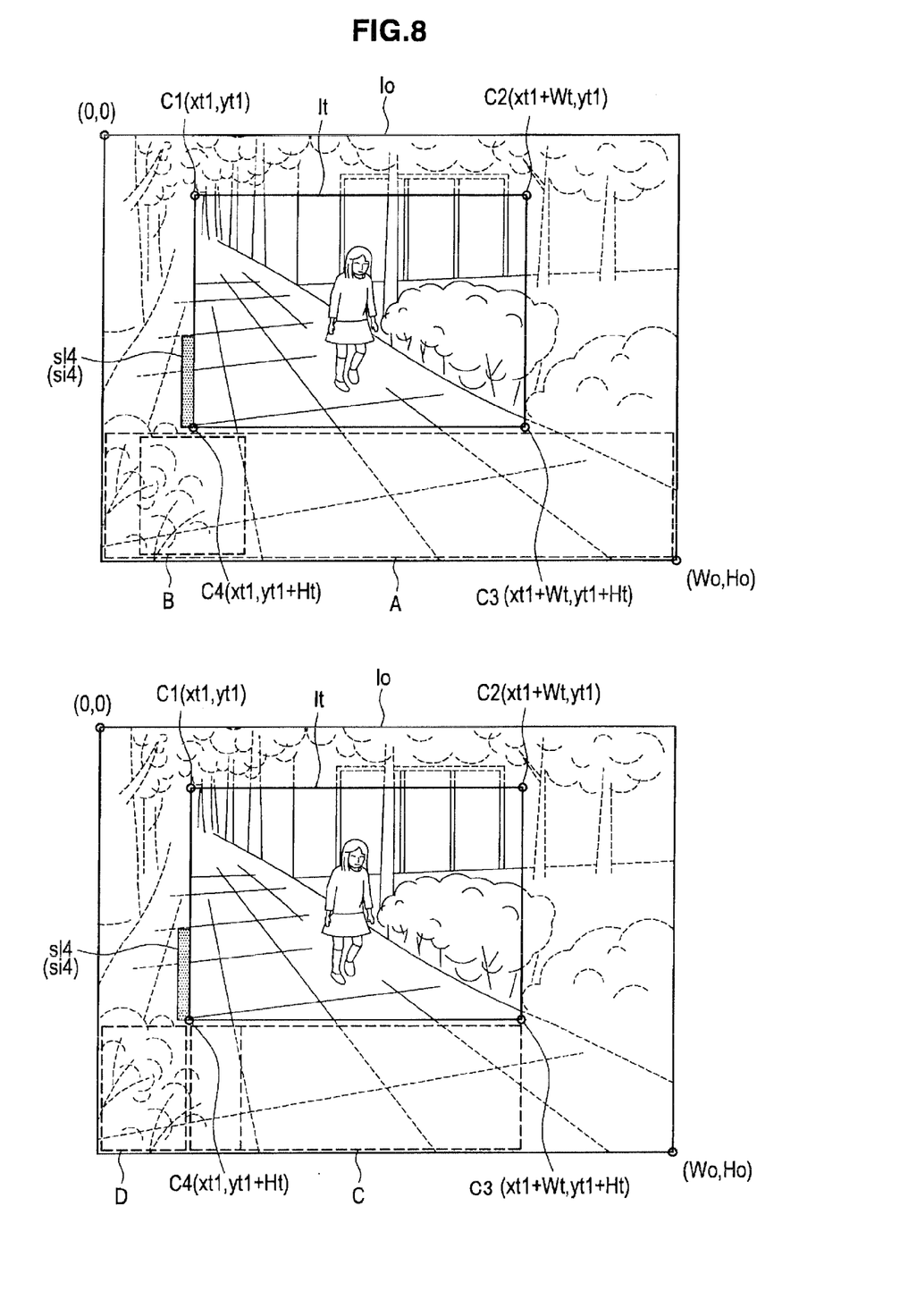
FIG. 8 is a diagram illustrating a modification example of the display method illustrated in FIG. 6.
Figure 9:
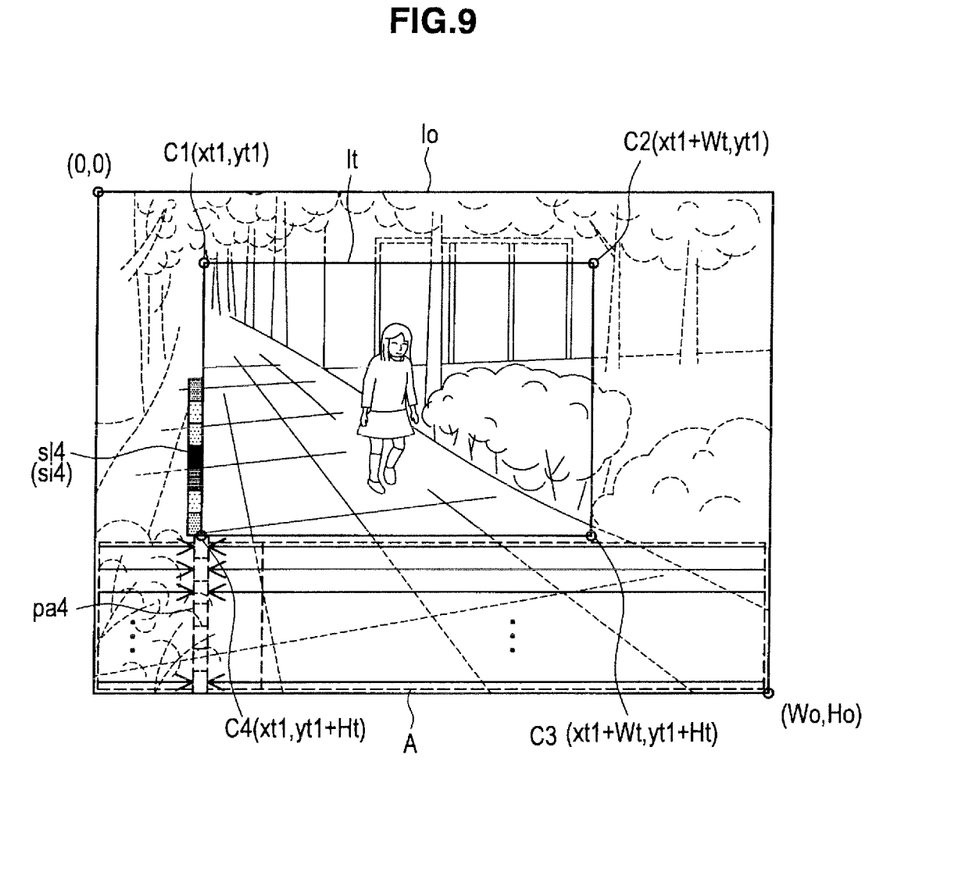
FIG. 9 is a diagram illustrating a modification example of the display method illustrated in FIG. 6.

For example, as illustrated in FIG. 8, the implication line sl4 extending upward from the corner portion c4 indicates a representative value of image data as the implication image si4 with respect to a predetermined region located in the out-of-frame region located at the lower side of the cut image It. Here, the implication line sl4, for example, can indicate a representative value of image data as the implication image si4 with respect to any region of out-of-frame regions A to D.

The out-of-frame region A is a region at the lower side of the corner portion c4 of the cut image It, in which the number of horizontal pixels is Wo and the number of vertical pixels is Ho−Ht−yt1 (=pl3). The out-of-frame region B is a region at the lower side of the corner portion c4 of the cut image It, in which the number of horizontal pixels is arbitrary and the number of vertical pixels is Ho−Ht−yt1 (=pl3). Furthermore, the out-of-frame region C is a region defined by the corner portions c3 and c4 of the cut image It, in which the number of horizontal pixels is Wt and the number of vertical pixels is Ho−Ht−yt1 (=pl3). The out-of-frame region D is a region at the left lower side of the corner portion c4 of the cut image It, in which the number of horizontal pixels is xt1 (=pl4) and the number of vertical pixels is Ho−Ht−yt1 (=pl3).

The implication image si, for example, in the case of the implication image si4, is extracted from the image data of the original image Io as a representative value of image data included in any region of the out-of-frame regions A to D. The implication line sl1 is displayed as a line segment having a predetermined width and filled with a representative value of image data as the implication image si.

Furthermore, the implication line s1 may be created to include a representative value of the image data of the region pa along a straight line orthogonal to the perpendicular line p1 as the implication image si, instead of the representative value of the image data of the region pa along the perpendicular line p1. For example, as illustrated in FIG. 8, the implication line sl4 extending upward from the corner portion c4 indicates the representative value of the image data of the region pa along a straight line, which is orthogonal to the perpendicular line p1 from the corner portion c4 to the lower frame of the original image Io, as the implication image si.

Here, the implication line s1, for example, can indicate the representative value of the image data as the implication image si with respect to any region of the out-of-frame regions A to D described above.

For example, when targeting the out-of-frame region A, the implication line s1 is created to include a representative value of image data of abscissas 0 to Wo in each pixel row as the implication image si in the region pa along the straight line orthogonal to the perpendicular line p1, that is, in the range of ordinates (Ho−Ht−yt1+1 to Ho) of the original image Io.

In this case, the out-of-frame region A is divided into a plurality of blocks including a predetermined number of pixel rows in the range of the ordinates (Ho−Ht−yt1+1 to Ho), and the implication image si is extracted as a representative value of image data included in each block. Then, the implication line s1 is displayed as a line segment having a predetermined width and filled in horizontal stripes with a representative value of image data of each block as the implication image si.

So far, the above description has been given about the case where the content of the image of the out-of-frame regions located at the upper side, lower side, left side and right side of the cut image It is displayed by employing the right upper corner portion c2 and the left lower corner portion c4 of the cut image It as a reference. However, as described above, the content of the image of the out-of-frame regions located at the upper side, lower side, left side and right side of the cut image It may be displayed by employing the corner portions c1 to c4 as a reference.

Consequently, it is possible to imply and display the content of the image of the out-of-frame regions, that is, whether an image is included in the out-of-frame regions (whether an image having the same quality as that of the cut image It is included and the like) without reducing the legibility of the cut image It. Furthermore, it is possible to further improve the accessibility of the cut image It to the original image Io using a limited display region.

5. DISPLAY METHOD FOR IMPLYING CONTENT OF IMAGE OF OUT-OF-FRAME REGION

Figure 10:
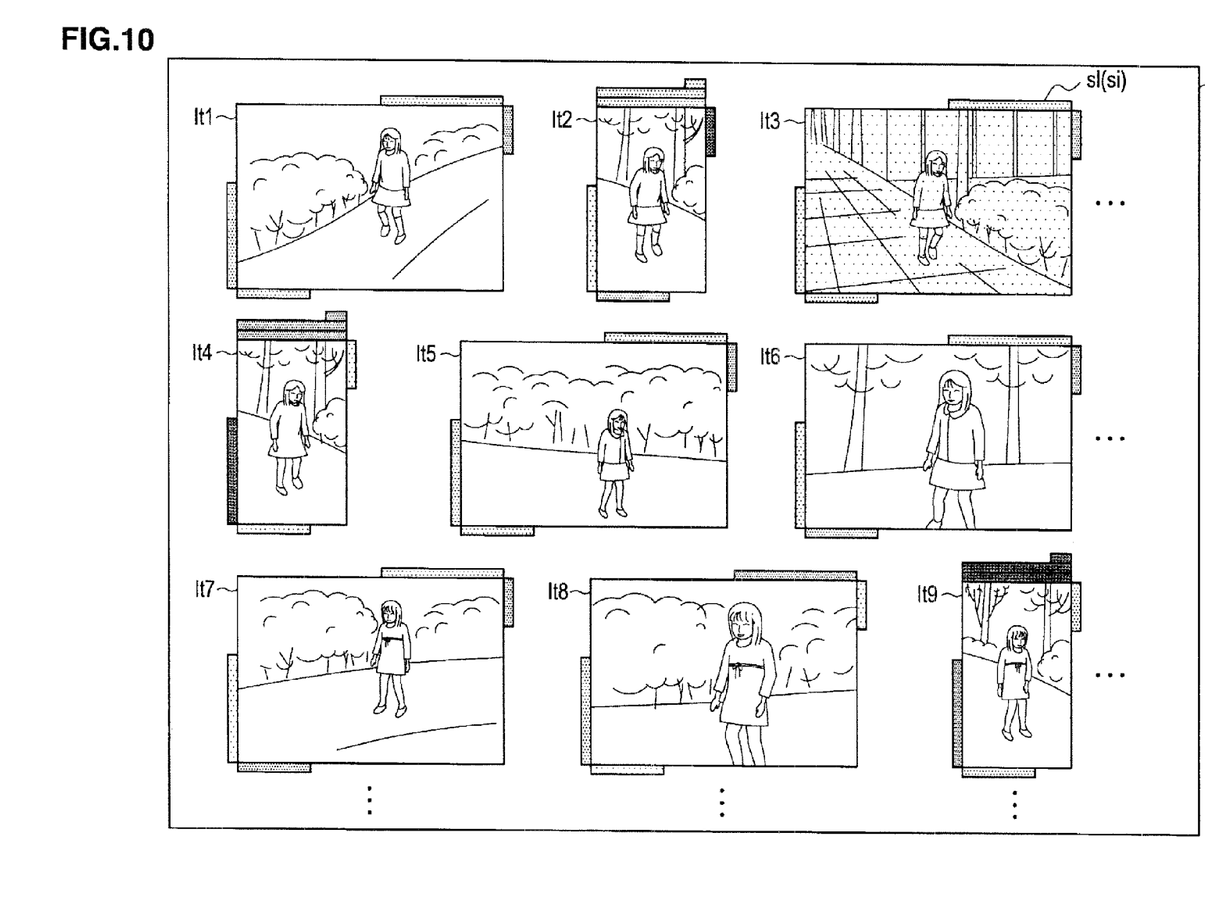
FIG. 10 is a diagram illustrating an application example of an image selection operation.

In accordance with the image display method according to the embodiment of the present invention, it is possible to improve operability in image selection. FIG. 10 illustrates a selection screen S of an image. As illustrated in FIG. 10, on the selection screen S, a plurality of cut images It including cut images It1 to It9 are displayed, and an indication line s1 including an indication image si is displayed together with each cut image It. In addition, in FIG. 10, the indication line s1 is displayed by allowing a folded portion to vertically overlap each other.

On the selection screen S, a user can select the cut image It or the original image Io. In the case of selecting the cut image It, the user selects a desired cut image It by a cursor operation or a touch operation based on information on the cut image It clearly displayed on the selection screen S, and operates a cut image selection button (not shown). For example, in FIG. 9, the cut image It3 is selected. If so, both the image data of the original image Io of the selected cut image It and cut frame information If are subject to a predetermined process, and for example, as illustrated in FIG. 10, the cut image It3 is displayed.

Meanwhile, in the case of selecting the original image Io, the user selects a desired original image Io based on information on the cut image It clearly displayed on the selection screen and information on an out-of-frame region located outside of the cut image It implied by the implication line s1.

Here, since the implication line s1 including the implication image si is displayed from the corner portion c of the cut image It, a user can definitely confirm information on the out-of-frame region together with the information on the cut image It. Furthermore, the user can confirm the content of the image of the out-of-frame regions, that is, whether an image is included in the out-of-frame regions (e.g., whether an image having the same quality as the cut image It is included), together with the range of the out-of-frame region, that is, the presence of the original image Io and the size of the original image Io, with reference to the implication line s1 including the implication image si.

Consequently, even when a plurality of cut images It are displayed on the selection screen S, a user can easily select a desired original image Io from the plurality of cut images It displayed using a limited display region.

Figure 11:
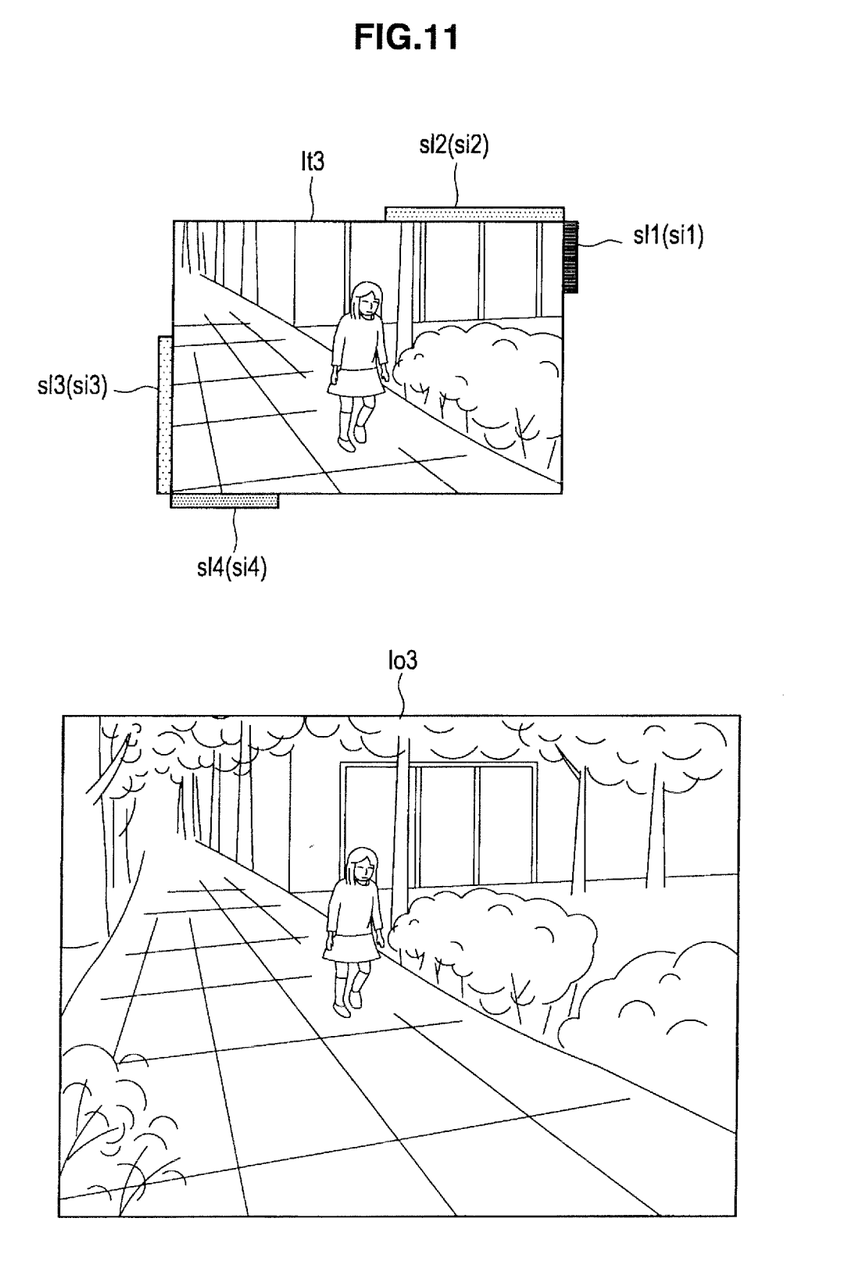
FIG. 11 is a diagram illustrating a display example of a selected image.

Then, the user selects a cut image It corresponding to the desired original image Io by a cursor operation or a touch operation, and operates an original image selection button (not shown). For example, in FIG. 9, the cut image It3 is selected. If so, the image data of the original image Io corresponding to the selected cut image It3 is subject to a predetermined process, and for example, as illustrated in FIG. 11, an original image Io3 is displayed.

6. CONCLUSION

As described above, in accordance with the image process apparatus 10 and the image display method according to the embodiment of the present invention, since the implication line s1 is displayed from the corner portion c of the cut image It, it is possible to display the range of the out-of-frame region as information of the out-of-frame region located outside of the cut image It. Furthermore, since the implication line s1 is displayed while extending to a side opposite to the outer frame serving as a reference of the original image Io, it is possible to improve the accessibility of the cut image It to the original image Io using a limited display region.

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

For example, the above description according to the embodiment has been given about the case where the shape of the cut image It is a rectangle. However, the case where the shape of the cut image It is a trapezoid or a parallelogram can also be described in the same manner. In this case, for example, the height of an out-of-frame region located at the upper side of the cut image It may not be constant. In such a case, two implication lines sl1 and sl1' (may include implication images si1 and si2) corresponding to the lengths of perpendicular lines pl1 and pl1' from the left upper corner portion c1 and the right upper corner portion c2 to the upper frame of the original image Io are displayed downward from the corner portions c1 and c2, so that it is possible to imply and display information of the out-of-frame region.

The present application contains subject matter related to that disclosed in Japanese Priority Patent Application JP 2010-140568 filed in the Japan Patent Office on Jun. 21, 2010, the entire content of which is hereby incorporated by reference.

What is claimed is:

1. An image display apparatus comprising:
   an acquisition unit for acquiring image data of an original image and cut frame information for designating a range of a cut image cut from the original image;
   a calculation unit for calculating a length of a perpendicular line from a corner portion of the cut image to an outer frame serving as a reference facing the corner portion of the cut image among outer frames of the original image, based on the cut frame information;
   a creation unit for creating an implication line corresponding to the length of the perpendicular line as image data; and
   a display unit for displaying the implication line extending from the corner portion of the cut image to a side opposite to the outer frame serving as the reference of the original image, together with the cut image.

2. The image display apparatus according to claim 1, wherein the creation unit creates an implication line including, as an implication image, image information of a region along the perpendicular line from the corner portion of the cut image to the outer frame serving as the reference of the original image.

3. The image display apparatus according to claim 2, wherein the implication image indicates a representative value of image data of the region along the perpendicular line.

4. The image display apparatus according to claim 2, wherein the implication image indicates a representative value of image data of a predetermined region located around the perpendicular line.

5. The image display apparatus according to claim 2, wherein the implication image indicates a representative value of image data of a region along a straight line orthogonal to the perpendicular line.

6. The image display apparatus according to claim 2, wherein the creation unit creates an implication line including the implication image to be displayed separately from the cut image.

7. The image display apparatus according to claim 1, wherein, when a length of the perpendicular line is greater than that of the cut image at a side opposite to the outer frame serving as the reference of the original image from the corner portion of the cut image, the creation unit creates the implication line to be folded and displayed in a range of the length of the cut image.

8. The image display apparatus according to claim 1, wherein the display unit displays the implication line at an outer edge side of the cut image without overlapping the cut image.

9. The image display apparatus according to claim 1, wherein the display unit displays the implication line at an inner edge side of the cut image while overlapping the cut image.

10. The image display apparatus according to claim 1, wherein the creation unit creates two implication lines corresponding to lengths of perpendicular lines from the corner portion of the cut image to two outer frames serving as references facing the corner portion of the cut image among outer frames of the original image, and the display unit displays the two implication lines extending from the corner portion of the cut image to sides opposite to corresponding outer frames.

11. The image display apparatus according to claim 10, wherein the corner portion of the cut image is a pair of corner portions located on a diagonal of the cut image.

12. The image display apparatus according to claim 1, wherein the display unit displays, for a plurality of original images, the cut images corresponding to the original images and the implication lines side by side.

13. An image display method comprising the steps of:
acquiring image data of an original image and cut frame information for designating a range of a cut image cut from the original image;
calculating a length of a perpendicular line from a corner portion of the cut image to an outer frame serving as a reference facing the corner portion of the cut image among outer frames of the original image, based on the cut frame information;
creating an implication line corresponding to the length of the perpendicular line as image data; and
with a display device
displaying the implication line extending from the corner portion of the cut image to a side opposite to the outer frame serving as the reference of the original image, together with the cut image.

14. The image display method according to claim 13, wherein the step of creating the implication line includes creating an implication line including, as an implication image, image information of a region along the perpendicular line from the corner portion of the cut image to the outer frame serving as the reference of the original image.

15. A non-transitory computer readable storage medium storing a program causing a computer to execute the steps of:
acquiring image data of an original image and cut frame information for designating a range of a cut image cut from the original image;
calculating a length of a perpendicular line from a corner portion of the cut image to an outer frame serving as a reference facing the corner portion of the cut image among outer frames of the original image, based on the cut frame information;
creating an implication line corresponding to the length of the perpendicular line as image data; and
displaying the implication line extending from the corner portion of the cut image to a side opposite to the outer frame serving as the reference of the original image, together with the cut image.

* * * * *